No. 640,948. Patented Jan. 9, 1900.
H. W. RIGHTMYER.
SHAPING ATTACHMENT FOR PLANERS.
(Application filed Mar. 16, 1898.)
(No Model.) 5 Sheets—Sheet 1.
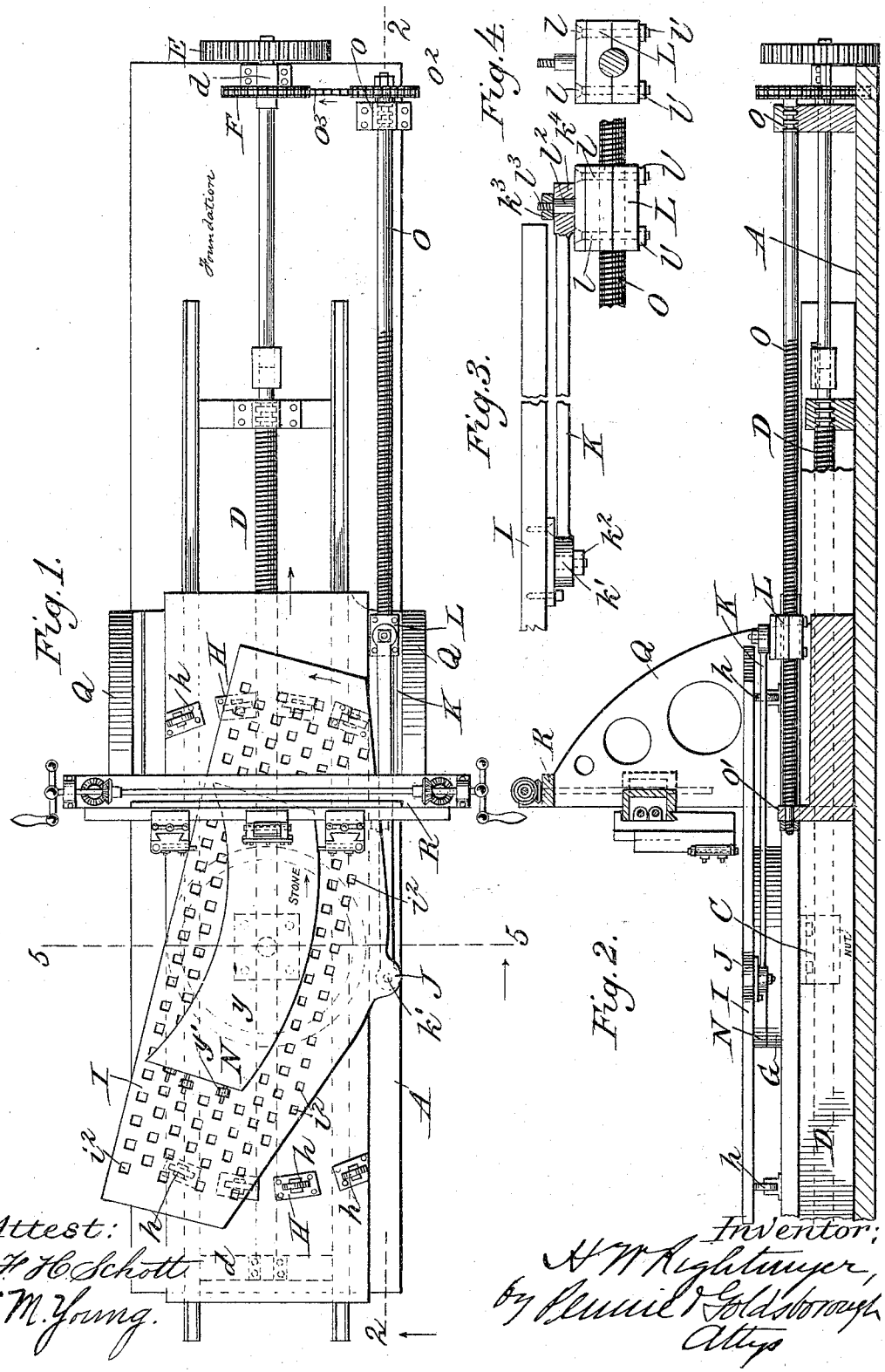

No. 640,948. Patented Jan. 9, 1900.
H. W. RIGHTMYER.
SHAPING ATTACHMENT FOR PLANERS.
(Application filed Mar. 16, 1898.)
(No Model.) 5 Sheets—Sheet 2.
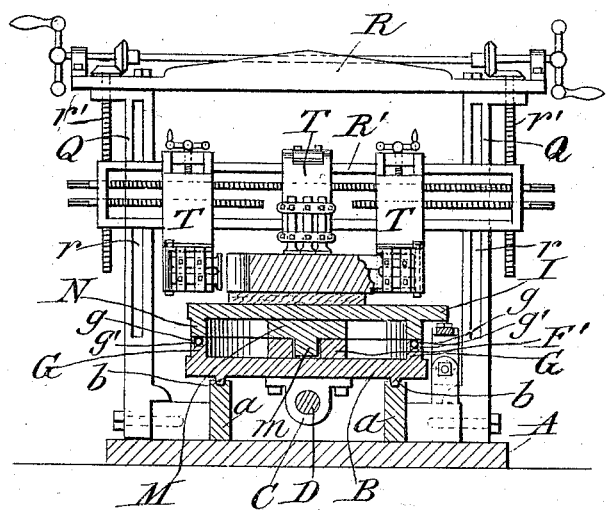
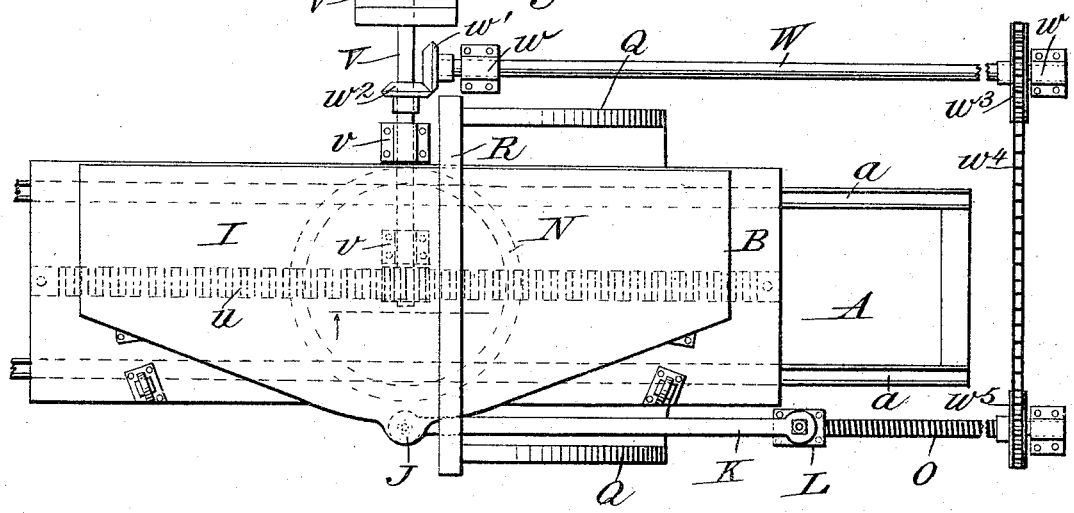
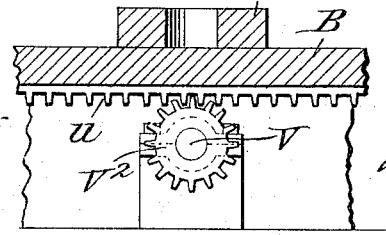
Attest:
F. H. Schott
O. M. Young
Inventor:
H. W. Rightmyer,
Munie & Goldsborough,
Attys.

No. 640,948. Patented Jan. 9, 1900.
H. W. RIGHTMYER.
SHAPING ATTACHMENT FOR PLANERS.
(Application filed Mar. 16, 1898.)
(No Model.) 5 Sheets—Sheet 3.
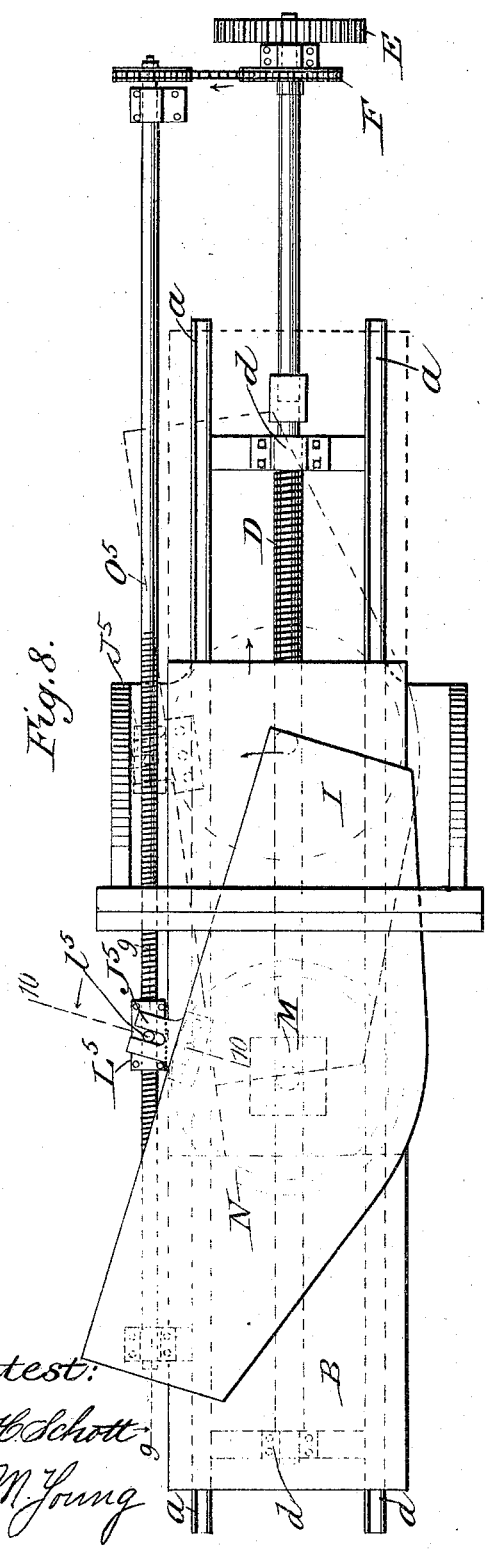
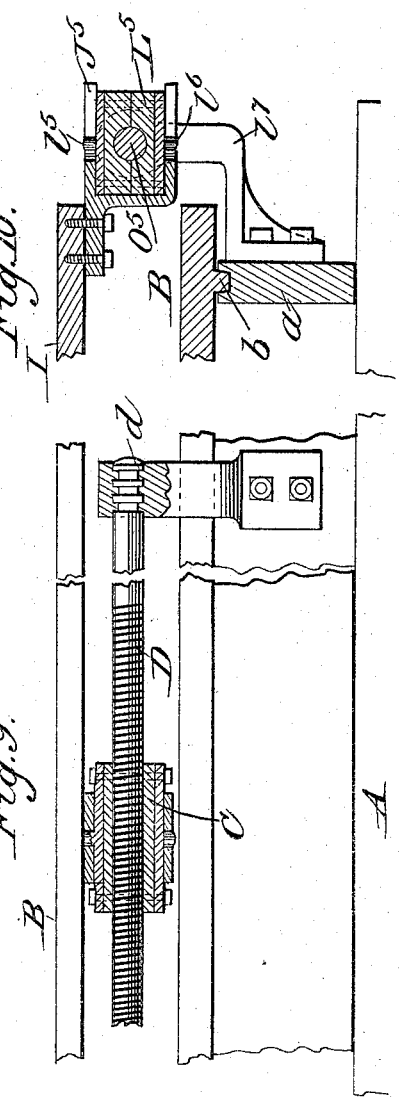
Attest:
H. H. Schott
E. M. Young
Inventor:
H. W. Rightmyer,
by Pennie & Goldsborough,
Attys.

No. 640,948. Patented Jan. 9, 1900.
H. W. RIGHTMYER.
SHAPING ATTACHMENT FOR PLANERS.
(Application filed Mar. 16, 1898.)
(No Model.) 5 Sheets—Sheet 4.
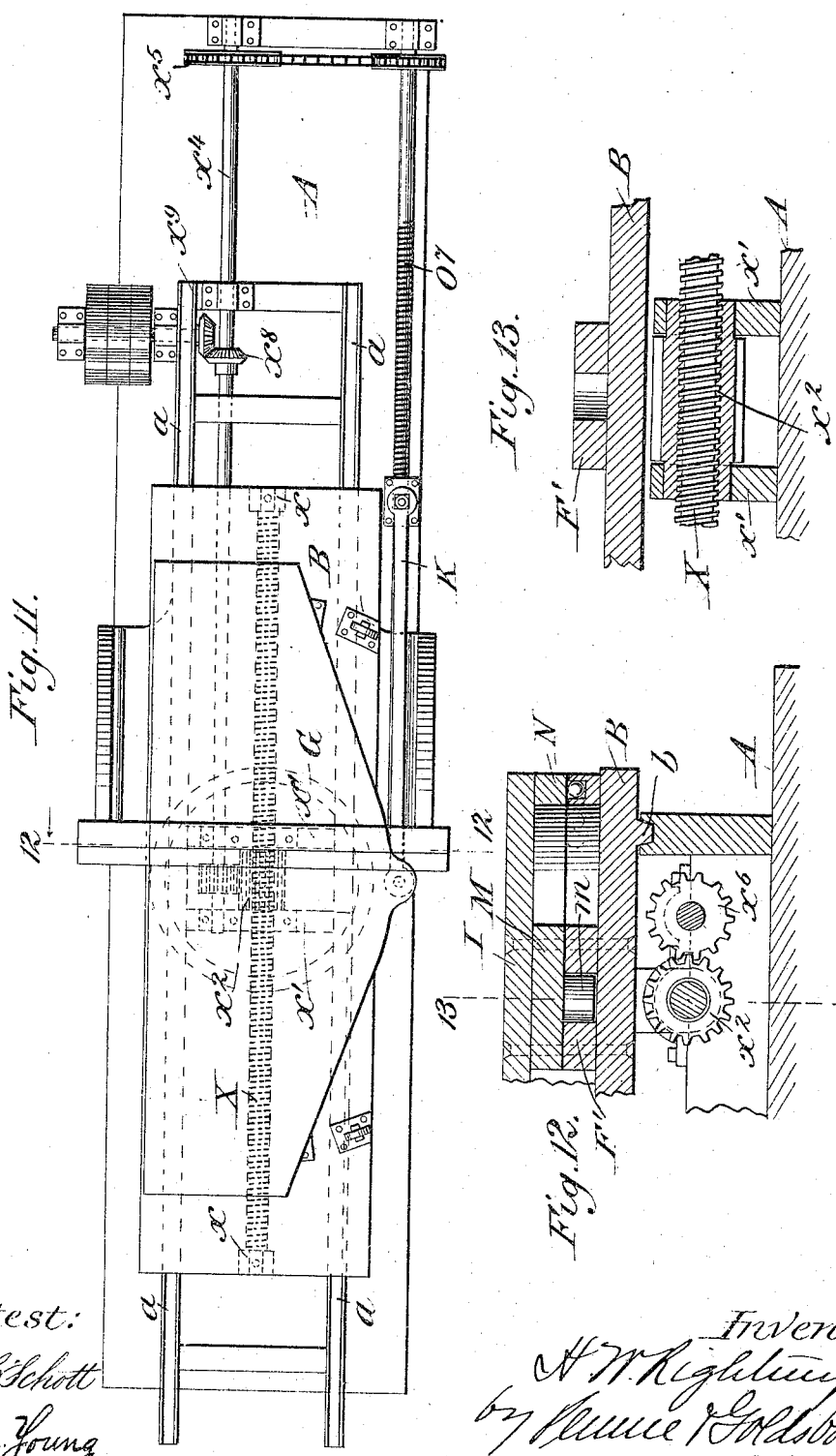
Attest:
F. H. Schott
E. M. Young
Inventor:
H. W. Rightmyer,
by Pennie & Goldsborough,
Attys.

No. 640,948. Patented Jan. 9, 1900.
H. W. RIGHTMYER.
SHAPING ATTACHMENT FOR PLANERS.
(Application filed Mar. 16, 1898.)
(No Model.) 5 Sheets—Sheet 5.
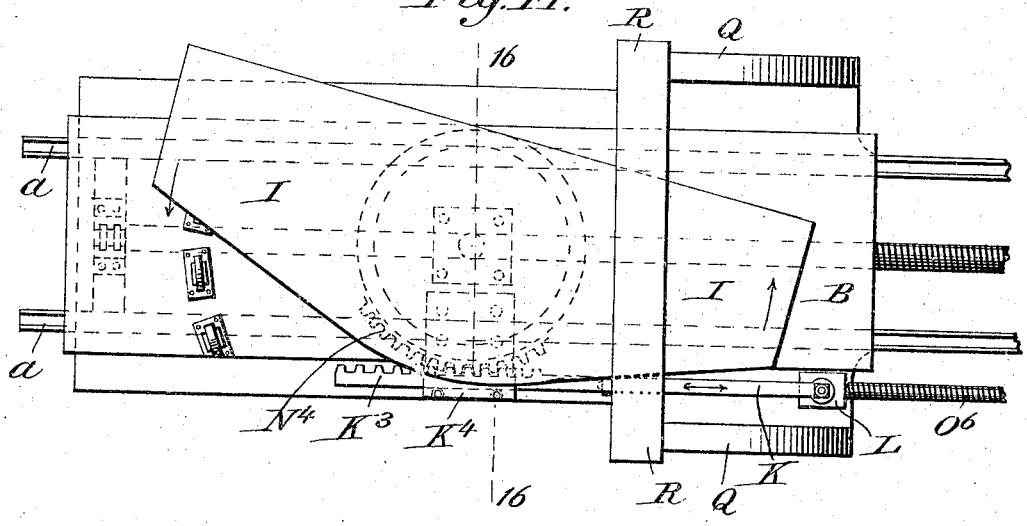
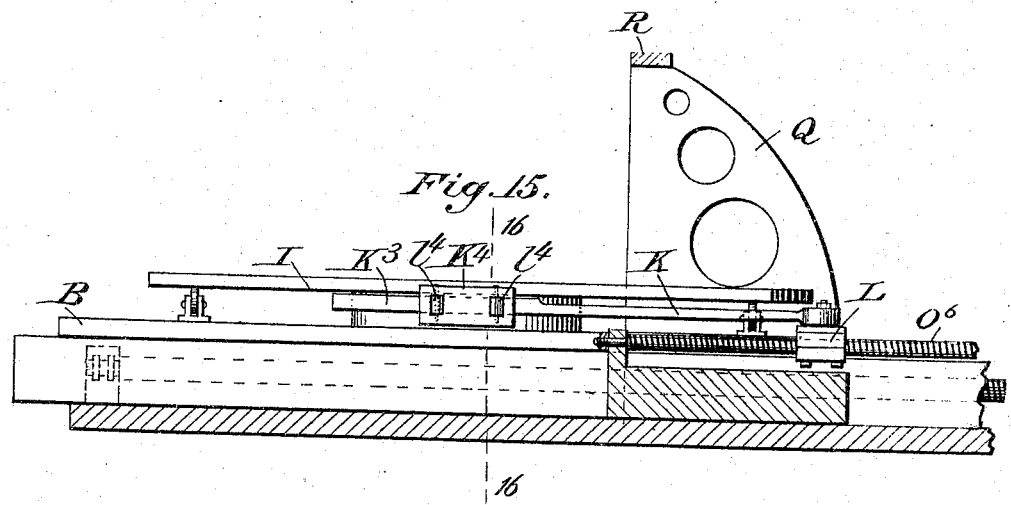
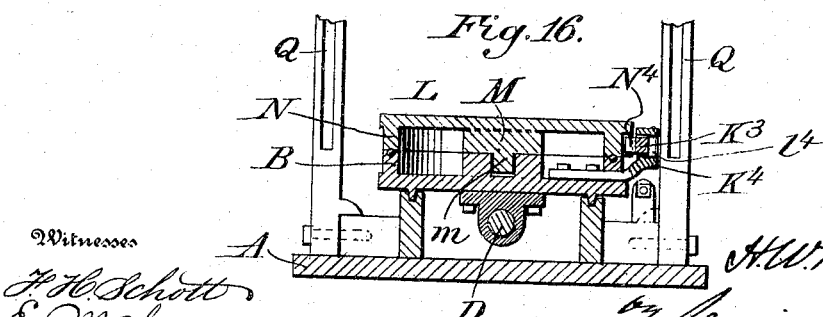
THE NORRIS PETERS CO., PHOTO-LITHO., WASHINGTON, D. C.

UNITED STATES PATENT OFFICE.

HOMER WESLEY RIGHTMYER, OF ROWLESBURG, WEST VIRGINIA.

SHAPING ATTACHMENT FOR PLANERS.

SPECIFICATION forming part of Letters Patent No. 640,948, dated January 9, 1900.

Application filed March 16, 1898. Serial No. 674,106. (No model.)

*To all whom it may concern:*

Be it known that I, HOMER WESLEY RIGHTMYER, a citizen of the United States, residing at Rowlesburg, Preston county, State of West Virginia, have invented certain new and useful Improvements in Shaping Attachments for Planers; and I do hereby declare the following to be a full, clear, and exact description of the invention, such as will enable others skilled in the art to which it appertains to make and use the same.

My invention relates to improvements in shaping attachments for planers, designed especially for use in the planing of stone, but applicable generally to the planing of other materials.

The object of the invention is to provide efficient mechanism for planing curved or circular shapes and for finishing or ornamenting the edges of blocks of stone or the like of circular contour.

The primary feature of the improvement is a pivotally-supported platen upon which the work is secured, combined with means for oscillating the platen simultaneously with the travel of the bed-plate of the machine.

The invention also embraces novel details of construction and combinations of parts, as hereinafter described, and defined in the appended claims.

In the accompanying drawings, Figure 1 is a plan view of a planer with my improvements applied thereto. Fig. 2 is a vertical section on the line 2 2 of Fig. 1. Figs. 3 and 4 are detail views illustrating the mechanism connecting the platen with its operating-shaft. Fig. 5 is a transverse section on the line 5 5 of Fig. 1. Fig. 6 is a plan view showing a modified construction of the operating-shafts and their gearing. Fig. 7 is a sectional elevation of the machine shown in Fig. 6, illustrating the gearing which moves the bed-plate. Figs. 8 and 9 are respectively a plan view and a vertical section of another modification, showing a different arrangement of the operating-shafts and their connections. Fig. 10 is a section on the line 10 10 of Fig. 8. Fig. 11 is a plan view of a third modification. Fig. 12 is a transverse section on the line 12 12 of Fig. 11, and Fig. 13 is a longitudinal section on the line 13 13 of Fig. 12. Fig. 14 is a plan view showing a further modification of the means for turning the platen shown in Fig. 1. Fig. 15 is a side view of Fig. 14; and Fig. 16 is a sectional view on the line 16 16, Fig. 14.

Referring to Figs. 1 to 5, inclusive, A indicates the base of the machine, upon which are secured two parallel grooved ways $a$ $a$.

B indicates the bed-plate of the machine, provided on its under side with parallel ribs or runners $b$ $b$, adapted to travel in the grooves of the ways $a$ $a$. (See Fig. 5.) Secured to the under side of the bed-plate B at a central point is a nut or internally-threaded bracket C, depending from the bed-plate, to receive a screw-shaft D. This shaft is mounted at the ends of the base A in bearings formed in cross-bars $d$ and is screw-threaded for part of its length, as shown. Upon the right-hand end of the shaft D, Fig. 1, are mounted a pulley E and a sprocket-wheel F. The pulley E is driven from any suitable source of power for the purpose of revolving the shaft D. As the shaft D passes through the interiorly-threaded block or bracket C, it will be apparent that the revolution of the shaft will move the block and the bed-plate to which it is attached longitudinally upon the ways $a'a$.

Centrally upon the upper side of the bed-plate B is arranged a socket-bearing F', which is surrounded by a concentric circular plate or bearing-ring G, formed with an annular groove $g$ on its upper face to receive antifriction-balls $g'$. The bed-plate B is also provided near each of its ends with a curved guideway H, made up of circularly-disposed antifriction-rollers $h$.

The platen I may conveniently be made triangular in form, as shown, having its ends square to form right angles with its straight side, while its opposite edge is inclined in opposite directions and provided with a lug J, to which is pivotally secured one end of a link K by a pin $k'$ and nut $k^2$, the opposite end of said link being pivotally secured to a movable block L, as will be further described hereinafter. The platen I is provided with series of holes $i^2$, as is usual, to facilitate the attachment thereto of the clamps for holding the work in position. The under side of the platen I is provided at its center with a plate M, from the center of which depends a stud $m$, resting in the socket-bearing F' of the bed-plate. Around this block M and concentric with the stud $m$ is arranged a ring N, adapted to bear upon the ball-bearings of the ring G of the bed-plate.

Near the front edge of the base A of the machine and parallel to the shaft D is arranged a second screw-threaded shaft O. The right-hand end of the shaft O is mounted in a bearing $o$ at the end of the frame A, while its opposite end is mounted in a bracket $o'$, rising from the base at a point slightly to the left of the longitudinal center of the base A. The ends of this shaft O, like those of the shaft D, are plain or unthreaded to permit the free revolution of the shafts in their bearings.

Upon the shaft O is secured an internally-threaded block L, preferably formed in separable sections secured together by bolts and nuts $l$ and $l'$, Figs. 3 and 4, and provided with an upwardly-projecting stud provided with a plain portion $l^2$ and a reduced threaded upper end $l^3$. The outer end $k^4$ of the link K is formed with an eye which fits over the stud $l^2$ and is secured thereon by a nut $k^3$.

The outer end of the shaft O extends slightly beyond its bearing $o$ to receive a sprocket-wheel $o^2$, which is rigidly mounted thereon and is geared to the sprocket-wheel F of the shaft D by an endless sprocket-chain $o^3$. It will be apparent that the revolution of the shaft D from any suitable source of power through the medium of the gear-pulley E will not only effect a longitudinal movement of the bed-plate, but will also, through the agency of the chain $o^3$, revolve the shaft O, and thus cause the block L to move in the same direction as the bed-plate. This travel of the block L communicates motion to the platen I through the link K, causing the platen to turn upon its stud-pivot in a curved or circular path, with the result of presenting the block of stone secured thereto to the planing-tools in the desired way to effect circular cutting.

While the tools and their supporting and adjusting devices are not novel features of the present invention, I have illustrated them in the drawings to show their location with relation to the platen. At about the longitudinal center of the base A the tool-holder frame rises, consisting of parallel upright brackets Q Q, connected by a cross-bar R. The uprights are slotted vertically, as at $r$, and from the cross-bar R is suspended, by adjusting-screws $r'$, a frame R', provided with transverse threaded rods carrying tool-holders T. The frame R' and the tool-holders are adjustable vertically and horizontally in the usual manner by bevel-gearing and hand-clamps, as shown in the drawings; but a specific description of these features is not deemed necessary, as they are well known in the art.

In Figs. 6 and 7 I have illustrated a modified arrangement of mechanism for moving the bed-plate B. In lieu of the threaded block on the under side of the bed-plate and the screw-shaft passing therethrough, as shown in Figs. 1 to 5, I provide the under side of the bed-plate with a central rack-bar $u$, extending throughout the length of the bed-plate. A transversely-arranged power-shaft V is employed, mounted in suitable bearings $v$ and provided with fixed and idle pulleys V' at its outer end and a spur gear-wheel $V^2$ at its inner end, the latter meshing with the rack-bar $u$. A counter-shaft W is arranged in bearings $w$ and provided at one end with a bevel-pinion $w'$, gearing with a similar pinion $w^2$ on the shaft V, and at its opposite end with a sprocket-pulley $w^3$, connected by an endless chain $w^4$ with a sprocket-pulley $w^5$ on the threaded shaft O. It is obvious that this form of gearing will accomplish the pivotal movement of the platen, as has been described in connection with the mechanism shown in Figs. 1 to 5, the link K and the other features being the same as in the first-described form.

In Figs. 8, 9, and 10 another modification is illustrated. In this instance the screw-shaft $O^5$ for operating the platen instead of being at the front edge of the bed-plate, as shown in Fig. 1, is arranged at the opposite side thereof and is longer than the shaft O of Fig. 1, giving a greater travel of the block $L^5$, which corresponds to the block L of Fig. 1. The link K and its lug J are omitted, and in lieu of these features I provide the platen at the center of its straight side with a forked bracket $J^5$. (Shown clearly in section in Fig. 10.) This bracket is provided with parallel forked arms which embrace the block $L^5$ and take over pins $l^5$ and $l^6$, projecting from the top and bottom of said block in the same vertical plane. The operation of the parts is apparent from the illustration by dotted lines in Fig. 8.

In Figs. 11, 12, and 13 a third modification is illustrated. In the construction shown in these figures the platen is provided with an operating-shaft $O^7$ and a link K, as in Fig. 1; but the mechanism for operating the bed-plate is different from the forms shown in the other figures. The under side of the bed-plate is provided with a fixed spirally-threaded shaft X, centrally supported in brackets $x$ and extending throughout the length of the bed-plate, as indicated by dotted lines in Fig. 11. Between transverse cross-bars $x'$ $x'$ and in bearings formed therein is mounted a revolving sleeve $x^2$, threaded internally to fit the threads of the stationary shaft X and formed on its outer surface with a series of ribs serving as spur-teeth. The shaft X extends through the sleeve $x^2$. A revolving shaft $x^4$ is supported in suitable bearings and provided at its inner end with a spur gear-wheel $x^6$, meshing with the teeth of the sleeve $x^2$, and at its outer end with a sprocket-wheel $x^5$, geared to the shaft $O^7$. The shaft $x^4$ is also provided with a bevel-gear $x^8$, which is geared to the power-shaft by a bevel-gear $x^9$, as shown.

The revolution of the sleeve $x^2$ through the shaft $x^4$ and spur-wheel $x^6$ causes the bed-plate to travel longitudinally. It will be understood that my invention comprehends the use of any of the several described forms of devices for moving the bed-plate, as well as any other equivalent mechanism for the purpose.

In Figs. 14, 15, and 16 a fourth modification is illustrated. This construction relates more particularly to the connection between the platen and its operating devices and is designed to provide an arrangement to insure the turning of the platen so as to cut the stone on a true circle. In this instance the screw-shaft $O^6$ is again placed at the front edge of the bed-plate, as in Fig. 1. Instead of connecting the platen to the link K by a pivot I form a gear-segment $N^4$ on the ring N and provide the front part of the link with a gear-rack $K^3$ on the inner side. The platen being held centrally on the bed-plate by the stud $m$ and the rack $K^3$ engaging directly with the gear-segment on the ring N, the platen is caused to turn so that all points on its surface will describe a true arc. The rack $K^3$ is held in contact with the gear-segment by a keeper $K^4$, provided with friction-rollers $l^4$, bearing against the back of the rack.

The operation of the parts has been explained in connection with the foregoing description of their construction. Hence a summary of the operation is deemed unnecessary. It may be added, however, that the stone block $y$, Fig. 1, may be readily adjusted to any desired position upon the platen I, upon which it is then secured by the usual clamping device $y'$. The capacity of the platen for rotary movement is sufficient to permit the formation of circular planing cuts of the desired extent, and by the proper adjustment of the tool-holder (see Fig. 5) the edges as well as the flat surface of the stone may be operated upon.

Having fully described my invention, what I claim is—

1. The combination in a planer, of a bed-plate, a platen pivotally supported upon said bed-plate, two parallel screw-shafts revolving in the same direction, mechanism geared to one of said shafts for moving the bed-plate longitudinally, an internally-threaded block on the other shaft, moving in unison with the bed-plate, and a link connecting said block with the platen, substantially as described.

2. The combination in a planer, of a bed-plate, a platen pivotally supported upon said bed-plate and provided at one side with a gear-segment, two parallel screw-shafts geared to revolve in the same direction, mechanism geared to one of said shafts for moving the bed-plate longitudinally, a movable block operated by the other shaft in unison with the bed-plate, and a link movably connected at one end to said block, and at its other end provided with a gear-rack engaging the gear-segment or the platen, as described.

3. The combination with the bed-plate of a planer, and with mechanism for moving the bed-plate longitudinally, of a platen pivotally supported upon the bed-plate, a screw-threaded shaft geared to the bed-plate-operating mechanism, an internally-threaded block arranged on said shaft and a link connecting said block with one side of the platen, substantially as described.

4. The combination in a planer, of a bed-plate, a platen, pivotally supported upon said bed-plate, two parallel screw-shafts revolving in the same direction, mechanism geared to one of said shafts for moving the bed-plate longitudinally, an internally-threaded block on the other shaft moving in unison with the bed-plate and a connection between said block and platen, substantially as described.

In testimony whereof I affix my signature in presence of two witnesses.

HOMER WESLEY RIGHTMYER.

Witnesses:
WM. W. VARNEY,
C. W. WISNER.